United States Patent [19]

Oakes

[11] 4,070,787

[45] Jan. 31, 1978

[54] RODENT TRAP

[76] Inventor: George W. Oakes, Crystal Heights, Crystal City, Mo. 63019

[21] Appl. No.: 722,193

[22] Filed: Sept. 10, 1976

[51] Int. Cl.² .................... A01M 23/24; A01M 23/26
[52] U.S. Cl. ........................................................ 43/94
[58] Field of Search .................. 43/90, 92, 93, 94, 95, 43/96, 97, 85, 88

[56] References Cited

U.S. PATENT DOCUMENTS

| 1,118,752 | 11/1914 | Estrada | 43/94 |
|---|---|---|---|
| 1,463,117 | 7/1923 | Gilmore et al. | 43/88 |
| 1,464,453 | 8/1923 | Stark et al. | 43/88 |
| 1,769,770 | 7/1930 | Clayton | 43/94 |
| 1,871,157 | 8/1932 | Clayton | 43/94 |

FOREIGN PATENT DOCUMENTS

| 579,055 | 6/1933 | Germany | 43/94 |
|---|---|---|---|

*Primary Examiner*—Russell R. Kinsey
*Assistant Examiner*—Robert P. Swiatek
*Attorney, Agent, or Firm*—Arthur A. March

[57] ABSTRACT

Readily assemblable two-part trap for killing mice and other rodents generally without mutilation including, as a preferably hand-holdable and manually graspable captive combination, a unitary resilient frame having an intermediate, e.g. generally U-shaped, bowed portion terminating in a pair of opposed rodent-gripping end jaws movable with respect to each other between a spaced apart cocked position and a closed position and normally resiliently biased to closed position under sufficient snap force to grip a rodent disposed therebetween, and a rodent-trippable unitary spacer trigger operatively interposed inter-engagingly with the frame, preferably in captive rocking relation therewith, to permit unhindered relative movement of the jaws with respect thereto between such positions, and having a rockingly releasable slip catch portion arranged for temporarily maintaining the jaws in cocked position against the biasing force of the frame and a cooperating bait-carrier tripper portion arranged in the immediate vicinity of the jaws and accessible to a rodent thereat for rockingly tripping the spacer trigger to release the slip catch portion and shut the trap, e.g. such that the rodent is caught by the jaws at the throat, and killed, but not mutilated, whereupon the trap may be used as a portable carrier for disposing of the rodent without the user having to touch the dead pest.

10 Claims, 7 Drawing Figures

RODENT TRAP

The present invention relates to a rodent trap, and more particularly to a two part mouse trap combination of a resiliently biased jaw frame and a spacer trigger interposed interengagingly therewith for releasably cocking the jaw frame and carrying the bait.

Many types of mouse traps and other rodent traps are known. However, conventional mouse traps normally provide killing power by use of a spring which is held under triggering control by the agency of compound levers so as to permit the trap to be tripped by mouse touch or mouse power. Thus, common drawbacks of generally all such known mouse traps include the fact that they are relatively complicated in design, contemplating a number of parts, often of intricate character, and in turn the fact that they involve comparatively high labor and other costs for manufacture and assembly.

It is an object of the present invention to overcome the foregoing drawbacks and to provide a novel rodent trap at an attractive low price from the standpoint of the consumer, and one which is simple and practical in design, durable and sturdy in construction, sufficient in spring power, yet which contains few operating parts.

It is another object of the invention to provide such a rodent trap for mice or other rodents which contains only two coacting parts, without the need for accessories, and which parts may be conveniently manufactured by versatile metal stamping techniques and in turn be readily assembled together generally without the need for tools.

It is still another object of the invention to provide a rodent trap of the foregoing type which is able to be safely set substantially automatically by simple manual manipulation, which operates preferably to catch the rodent at the throat so as to kill it without mutilating it, and which trap can be rid of its contents without difficulty and without having to touch the dead rodent in order to remove it.

Other and further objects of the present invention will become apparent from a study of the within specification and accompanying drawings, in which.

Figure 1:
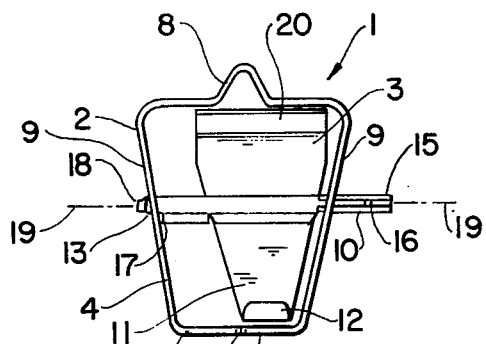
FIGS. 1 and 2 are schematic top views of a rodent trap according to an embodiment of the invention, showing the trap in closed and open positions respectively.

In acccordance with a basic feature of the present invention, a readily assemblable two-part rodent trap for killing efficiently mice, rats and other rodents, without mutilation, may be advantageously provided, which comprises in essence a unitary resilient jaw frame and a unitary spacer trigger therefor.

The unitary resilient frame has an intermediate portion and a pair of opposed coacting rodent-gripping end jaws. The jaws are movable with respect to each other between a spaced apart cocked position and a closed position and are normally resiliently biased to closed position under sufficient snap force to grip a rodent disposed therebetween.

The rodent-trippable unitary spacer trigger is operatively interposed interengagingly with the frame to permit unhindered relative movement of the jaws with respect thereto between such cocked and closed positions and has a releasable slip catch portion and a cooperating bait-carrier tripper portion. The releasable slip catch portion is arranged for temporarily maintaining the jaws in the spaced apart cocked position against the biasing force of the frame and the cooperating bait-carrier tripper portion is arranged in the vicinity of the jaws and accessible to a rodent threat for tripping the spacer trigger to release the slip catch portion and close the jaws under snap force sufficient to grip such rodent.

In accordance with one preferred aspect of the rodent trap apparatus of the invention, the frame includes means defining an arm receiving rocker opening or hole therein which contains a slip catch notch engaging edge, and the spacer trigger is rockingly mounted on the frame and includes a rocker arm extending operatively through the arm receiving rocker opening for unhindered relative movement with respect thereto. The rocker arm is provided with a cooperating slip catch notch defined thereon for rockingly releasably engaging the notch engaging edge upon moving the jaws against the biasing force of the frame to the cocked position and thereby slight touch-sensitively temporarily maintaining the jaws in spaced apart position. This position will be maintained conveniently until actuation of the bait-carrier tripper portion causes rocking of the rocker arm and in turn slipping of the notch from engagement with the notch engaging edge to release the jaws for snap force closure.

More particularly, the rocker arm desirably contains a curved surface portion and the slip catch notch is defined in such curved surface portion for enhancing the sensitivity of the triggering system.

As to the jaw frame, it is expediently provided in bowed configuration and terminates in end jaws which are inwardly directed or in mutually facing relation. The frame generally perimetrically confines the spacer trigger in captively interposed relation therewith. By providing the frame in the form of a, preferably substantially rectangularly perimetric, flat leaf spring or the like with a selectively peripherally outwardly extending crimped central spanning portion located in the bowed intermediate portion, efficient increase in the biasing force of the frame is correspondingly made possible for a given inherent degree of resiliency as concerns the particular spring metal or other appropriate material selectively used for the frame.

In this regard, the spacer trigger may be readily mounted on the frame for rocking about a crosswise axis of pivot. Such pivot axis inherently divides the spacer trigger into the bait-carrier tripper portion located on the side of the pivot axis adjacent the jaws of the frame and a corresponding counter-balancing portion located on the side of the pivot axis remote from the jaws and adjacent the intermediate portion of the frame. By making the counter-balancing portion sufficiently selectively heavier than the bait-carrier trigger portion, the slip catch notch may be concordantly maintained in normal slight touch-sensitive temporary engagement with the notch engaging edge when the jaws are in cocked position.

In connection with one particular embodiment of the invention, a pair of opposed arm receiving rocker openings are defined in the frame at least one of which contains such a slip catch notch engaging edge. The spacer trigger is rockingly mounted on the frame and in turn includes a pair of opposed rocker arms which extend operatively through the arm receiving rocker openings at least one of which rocker arms correspondingly is arranged for unhindered relative movement with respect to the at least one rocker opening containing the notch engaging edge. Suitably, that rocker arm is provided with such a slip catch notch defined thereon for rockingly releasably engaging such notch engaging edge on the frame upon moving the jaws against the biasing force of the frame to cocked position. In such position, the notch thereby temporarily maintains the jaws in spaced apart position until actuation of the bait-carrier tripper portion in the immediate vicinity of the jaws. This causes rocking of the rocker arms and in turn slipping of the corresponding notch from engagement with such notch engaging edge to release the jaws for snap force closure.

In this regard, the other of the rocker arms may be provided with an abutment shoulder inwardly of the frame and in facing relation to the corresponding arm receiving opening thereat and an offset outer retainer end portion or bent end outwardly of the frame and in facing relation to such arm receiving opening. This will suitably prevent relative linear movement between the spacer trigger and frame thereat while permitting relative rocking movement therebetween about the common pivot axis defined by the pair of rocker arms yet such movement will be carried out under low friction at the pressure point contact between the frame and the abutment shoulder.

Figure 3:
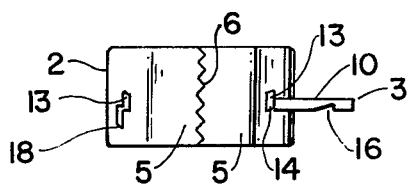
FIGS. 3 and 4 are schematic front elevational views of the trap corresponding respectively to the positions shown in FIGS. 1 and 2.
Figure 4:
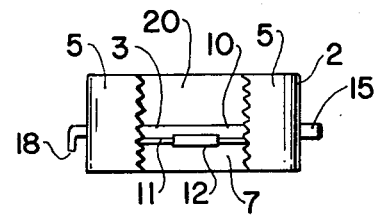

Referring to the drawing, one form of the readily assemblable two-part rodent trap 1 is shown, including the unitary resilient jaw frame 2 and the unitary spacer trigger 3. Frame 2 is provided with an intermediate bowed or generally U-shaped portion 4 and a pair of opposed coacting rodent-gripping end jaws 5,5 which are generally inwardly directed toward one another, i.e. in mutually facing relation for common contact as at 6. Jaws 5,5 are movable with respect to each other between a spaced apart cocked position (FIGS. 2 and 4) and a closed position (FIGS. 1 and 3).

Frame intermediate portion 4 is suitably provided of material of strong resilient characteristics such as spring metal, or leaf spring or flat spring stampable spring stock, whereby the jaws 5,5 into which the intermediate portion 4 terminates are inherently normally resiliently biased to closed position under sufficient snap force or snap action to grip generally fatally a rodent disposed therebetween as at the gap 7. Frame 2 generally perimetrically confines the spacer trigger 3 in captively interposed relation therewith and is most often provided in the form of a substantially rectangularly perimetric outer flat leaf spring or the like type strap material.

In any case, by the optional inclusion of a selectively peripherally outwardly extending crimped or arcuately bent central spanning portion or transverse spine or bulge 8 located in the bowed intermediate portion 2, efficient enhancement of or increase in the biasing force of the frame 2 is correspondingly made possible. As the artisan will appreciate, the frame may be provided in simple, inexpensive flat leaf spring form or ridges (not shown) may be stamped therein to reinforce the frame and increase the inherent resilient snap force of the trap.

The rodent-trippable unitary spacer trigger 3 is operatively interposed interengagingly with frame 2, i.e. at the opposed transitional lateral extremities 9,9 of the intermediate bowed portion 4, so as to permit unhindered relative movement of jaws 5,5 with respect to the spacer trigger between the cocked and closed positions. Spacer trigger 3 has a releasable slip catch portion 10 and a cooperataing bait-carrier tripper portion 11. The releasable slip catch portion 10 is arranged for temporarily maintaining jaws 5,5 in spaced apart cocked position against the biasing force of the frame 2, whereas the cooperating bait-carrier tripper portion 11 is arranged in the vicinity of the jaws and is accessible thereat for tripping the spacer trigger.

Bait-holding tab 12 is provided at the extreme end portion of bait-carrier tripper portion 11 in the immediate vicinity of the jaws at gap 7 (FIG. 2) for the desired purpose. By selectively sizing the width, i.e. height, of the spring strip forming frame 2, the bait-carrier tripper portion 11 will advantageously be more readily accessible to the rodent at the wide open gap 7 in preference to the open top of the horizontally disposed trap, and thus the rodent will be more apt to seek the bait directly through the jaw gap 7 than to reach up and over the sides of the perimetrically confining frame 2 to get at the bait via such unnecessary tortuous detour (see FIG. 4).

In any case, the actuation by the rodent of the bait-carrier tripper portion 11 trips the spacer trigger to release the slip catch portion 10 and close the jaws under the desired snap force to grip the rodent at gap 7. Bait such as cheese is readily and conveniently lodgable at bait-holding tab 12.

For achieving operative interposed interengaging of the two basic parts of the rodent trap, the frame 2 may be provided with a pair of opposed arm receiving rocker openings or holes 13,13 therein, such as at the lateral extremities 9,9. In order to accommodate the releasable slip catch portion 10 of the spacer trigger 3, frame 2 is appropriately provided with a corresponding slip catch notch engaging edge 14. Thus, spacer trigger 3 is rockingly mounted on frame 2, having its pair of opposed rocker arms 15,15 extending operatively through the arm receiving rocker openings 13,13.

The parts are arranged such that there is unhindered relative movement between the appropriate rocker arm 15 and the arm receiving rocker opening 13 correspondingly containing the notch engaging edge 14, whereby to permit the slip catch notch 16 defined on such rocker arm to engage rockingly releasably such notch engaging edge 14 upon moving the jaws 5,5 against the biasing force of frame 2 to the cocked position. In this way, the jaws 5,5 will be suitably slight touch-sensitively temporarily maintained in spaced apart position until actuation of the bait-carrier tripper portion 11, e.g. by wiggling or otherwise disturbing the sentsitive-to-touch cocked arrangement, causes rocking of rocker arms 15,15 and in turn slipping of the corresponding notch 16 from engagement with the notch engaging edge 14 to release the jaws for snap force closure.

It will be noted that in the embodiment shown, only one of the rocker arms 15 is arranged for unhindered relative movement with respect to the corresponding rocker opening 13 for contact with its notch engaging edge 14 via the slip catch notch 16 on that rocker arm, whereas the other rocker arm 15 contains means to prevent relative linear, i.e. axial or transverse, movement between the spacer trigger and frame at its associated rocker opening 13. In this regard, such other rocker arm 15, i.e. as viewed on the left in FIGS. 1–3, is provided for example with an integral abutment shoulder 17 or the like inwardly of frame 2 and in facing relation to the corresponding arm receiving opening 13 thereat, as well as an integral offset or bent over outer retainer end portion 18 or the like outwardly of the frame and in facing relation to such arm receiving opening.

This arrangement permits readily the stretching or distending at the lateral extremities 9,9 of the intermediate or bowed portion 4 of frame 2 to cock the jaws 5,5 against the articulating or pivotally movable, but axially relatively nonmovable, connection of spacer trigger 3 therewith, i.e. via abutment shoulder 17 and bent over end portion 18 with the corresponding arm receiving opening 13 thereat, in conjunction with the freely articulating or pivotally movable as well as axially relatively movable corresponding connection therewith, i.e. via the area containing slip catch notch 16 on the opposite rocker arm with the adjacent notch engaging edge 14 of the arm receiving opening thereat.

Figure 2:
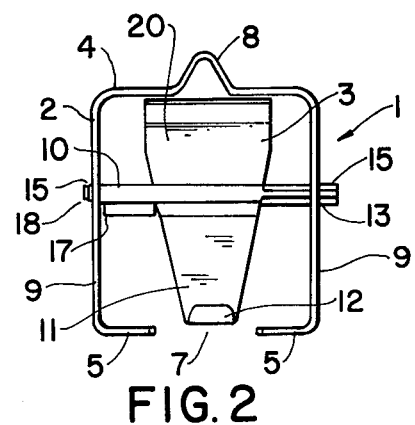

Such movement apart of the jaws can be simply and safely carried out by the user, merely upon grasping the lateral extremities 9,9 of frame 2 with the hands to achieve the change in position from that shown in FIG. 1 to that shown in FIG. 2, while pressing downwardly as by thumb force the spacer trigger 3, e.g. in the vicinity of slip catch portion 10, to facilitate seating of notch 16 against notch engaging edge 14 to hold temporarily the two parts in spaced, cocked relation under the tension biasing force of frame 2 acting against the releasable slip catch portion 10 of spacer trigger 3 as defined by such notch and edge interengagement. Of course, the point contact of abutment shoulder 17 with the marginal area of the corresponding opening 13 thereat, so as to take the pressure when the jaws are set, will permit unhindered, i.e. little friction, type rocking movement at such pressure point while the bent end portion 18 will prevent detachment between the parts thereat.

Thus, frame 2 perimetrically confines or captively embraces spacer trigger 3 in interposed relation therewith, such that the rocker arms 15,15 define a common pivot axis 19 which inherently divides the spacer trigger into the bait-carrier tripper portion 11, which is located on the side of the pivot axis adjacent the frame jaws 5,5, and a corresponding counter-balancing portion 20, which is located on the side of the pivot axis remote from the jaws and adjacent the intermediate portion 4 of frame 2.

In accordance with an advantageous feature of the invention, counter-balancing portion 20 is selected in size, weight and configuration suitably conjointly sufficient to render the same sufficiently selectively heavier than the bait-carrier tripper portion 11, i.e. when equipped with bait thereon, for normally maintaining the slip catch notch 16 in engagement with the notch engaging edge 14 coacting therewith when the jaws are in cocked position.

It will be appreciated that in the embodiment shown, only one notch and notch engaging edge arrangement is provided for relative unilateral axial displacement between frame 2 and spacer trigger 3, due to the more or less fixed linear connection at abutment shoulder 17 and bent end retainer portion 18, with respect to the opposite portion of the assembly. However, the construction may be readily optionally modified by omitting shoulder 17 and replacing bent end portion 18 by a similar end portion configuration to that shown on the remaining side of the apparatus so as to contain a corresponding slip catch notch 16a (as shown in phantom in FIG. 6) on the rocker arm thereat for engaging the appropriate notch engaging edge inherently defined along the margin of the adjacent rocker opening 13 thereat.

Such alternative bilateral axial displacement connection arrangement between frame 2 and spacer trigger 3 is equally simple and safe insofar as cocking the jaws is concerned. In this instance, as the jaws are manually drawn apart, both notches 16 and 16a will appropriately become seated at the corresponding notch engaging edges to hold the arrangement in cocked position.

Advantageously, the appropriate slip catch portion 10 of spacer trigger 3 is preferably provided in the form of a curved surface portion 21 on the particular rocker arm 15. This may be achieved by bending the area of such rocker arm into a hollow crescent shape, or by otherwise providing such curved surface portion as desired, whereby the corresponding slip catch notch will in turn be defined, e.g. crosswise or radially, in such curved surface portion 21 (see FIGS. 5 to 7) for enhancing the sensitivity of the triggering system.

Figure 5:
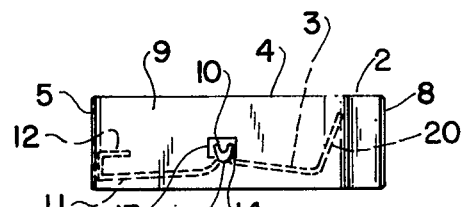
FIG. 5 is a schematic side elevational view of the trap in open or cocked position showing details of the rockingly releasable slip catch arrangement.
Figure 6:
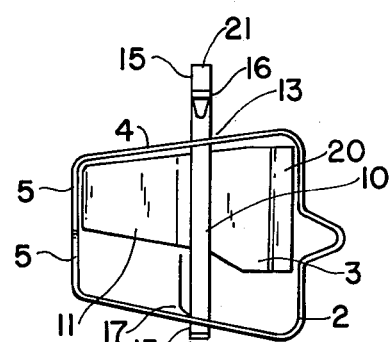
FIG. 6 is a schematic bottom view of a modification of the trap in closed position showing further details of the slip catch feature.
Figure 7:
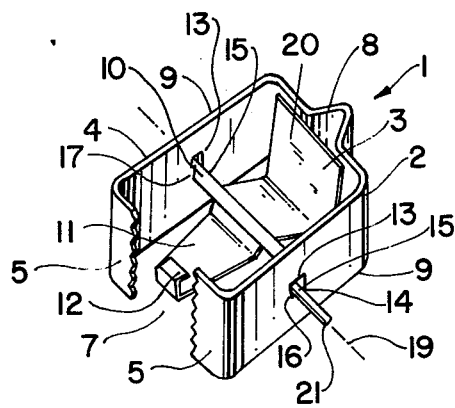
FIG. 7 is a schematic perspective view of the trap in cocked position and is illustrative of the spatial orientation and simplicity of the two readily assembled primary coacting parts.

As will be appreciated especially from FIGS. 3, 5 and 6, the configuration of the slip catch notch 16 and/or 16a is such that slight displacement of the slip catch portion 10 in relation to the point of interengagement thereof with frame 2, upon rodent-actuating disturbance of the delicately balanced disposition of the cocked jaws via the bait-carrier tripper portion, will cause dislodgement of the notch sufficient to spring the trap. Since the slip catch notch is preferably defined in a circumferentially or peripherally curved portion of the rocker arm associated therewith and is in the form of an axially directed inclined surface portion notch or groove readily rotatable with the rocker arm, e.g. as located at the underside of the corresponding arm, slight rocking or rotative motion of slip catch portion 10 will release notch 16 and/or 16a and allow the corresponding notch engaging edge to ride out of the notch and up the inclined surface portion thereof under the snap force inherently provided by the tension biasing force of the spring material used for providing frame 2, to shut the trap.

It will be appreciated by the skilled artisan that the present invention therefore advantageously provides a rodent trap, indeed a better mouse trap, durable and sturdy in construction, having a design characterized by practicality and simplicity, and contemplating few coacting means on the two unitary parts utilized, whereby to make the same commercially available to the consumer at a comparatively low and attractive price due to the concomitantly low contemplated labor costs in manufacturing and assembling the two basic parts from readily machine stampable metal stock material.

Such metal stock or the like material is generally very inexpensive and need not be of attractive, smooth surface appearance, considering its ultimate purpose. Of course, a basic requirement of the frame part is that it be made from spring strap or strip type material or other material having sufficient inherent or provided resilient force for snap action closure of the jaw elements of the frame to grip generally fatally the rodent.

Conventional stamping techniques lend themselves to providing the frame conveniently as a rather rectangular-shaped strap part so that the spacer trigger part can take the simple form of a cross-arm part pivoted crosswise or transversely near the center portion of the longitudinally extending frame with the cross-arms extending rockingly through openings in the lateral extremities of the intermediate portion of the frame. Such parts in turn are readily interengagingly assembled without tools, since the bent outer end portion 18 can be easily inserted outwardly through its coacting rocker arm opening up to abutment shoulder 17 and thereafter the opposite rocker arm can be similarly inserted through its corresponding rocker arm opening, utilizing the inherent capability of the resilient frame to distend the jaws sufficiently to permit insertion of the outer end of that arm outwardly through such opening.

In the case of the alternative embodiment of bilateral notch engagement utilizing notches 16 and 16a, mere bilateral distending of the jaws of the frame will permit ready insertion appropriately of the spacer trigger arms in the adjacent rocker arm openings of the lateral extremities of the frame.

By suitable selection of the shape and size of the counter-balancing portion 20 as compared with the bait-carrier tripper portion 11, the spacer trigger slip catch portion 10 advantageously is able to be selectively temporarily maintained in operative contact with the frame to keep the jaws in cocked position until rodenactuation of the trap takes place, e.g. by slight pressing down at the bait-carrier tripper portion sufficiently to rock or rotate the crosswise disposed, pivotally arranged spacer trigger slightly yet enough to cause the particular notch to slip off of the corresponding notch engaging edge for snap closure of the jaws.

One significant feature of the invention, as can be readily appreciated from FIGS. 1 and 2, is that due to the placement of the bait on the bait-carrier tripper portion 11 immediately adjacent the gap 7 between the jaws 5,5, the mouse will most likely generally be caught at the throat, and be killed but not be mutilated, whereupon the sprung trap and the dead rodent can be removed from its site without touching the deat pest, and at the disposal point, the user can merely manually spread apart the jaws in the usual manner to release the dead pest from the portable apparatus and simultaneously reset the trap more or less automatically. Hence, the trap apparatus is completely safe to set and to remove the dead rodent, without having to touch the dead rodent, an important feature as regards those, especially women, who are averse to undergoing such experiences.

Another significant feature of the invention is that special bending of the frame material, e.g. to provide the transverse spine or crimped portion 8, enables the spring power of the system to be conveniently provided without having to use a higher priced metal material otherwise to achieve a comparable degree of spring power. Generally, any overall perimetric shape or configuration for the frame is usable so long as the requisite spring strength is present and the jaws can be tripped easily via the spacer tripper.

It will be realized that the foregoing specification and drawings are set forth by way of illustration and not limitation, and that various modifications and changes may be made therein without departing from the spirit and scope of the present invention, which is to be limited solely by the scope of the appended claims.

What is claimed is:

1. Rodent trap apparatus which comprises
a unitary resilient frame having an intermediate portion and a pair of opposed coacting rodent-gripping end jaws movable with respect to each other between a spaced apart cocked position and a closed position and normally resiliently biased to closed position under sufficient snap force to grip a rodent disposed therebetween, and
a rodent-trippable unitary spacer trigger operatively interposed interengagingly with the frame to permit unhindered relative movement of the jaws with respect thereto between such positions and having a rockingly releasable slip catch portion arranged for temporarily maintaining the jaws in the spaced apart cocked position against the biasing force of the frame and a cooperating selectively counterbalanced rockable bait-carrier tripper portion which is selectively counterbalanced to permit the slip catch portion to normally maintain the jaws in cocked position and arranged in the vicinity of the jaws and accessible to a rodent threat for tripping the spacer trigger to release the slip catch portion and close the jaws under snap force to grip such rodent.

2. Apparatus according to claim 1 wherein the frame includes means defining an arm receiving rocker opening therein which contains a slip catch notch engaging edge, and the spacer trigger is rockingly mounted on the frame and includes a rocker arm extending operatively through the arm receiving rocker opening for unhindered relative movement with respect thereto and provided with a slip catch notch defined thereon for rockingly releasably engaging the notch engaging edge upon moving the jaws against the biasing force of the frame to the cocked position and thereby temporarily maintaining the jaws in spaced apart position until actuation of the bait-carrier tripper portion causes rocking of the rocker arm and in turn slipping of the notch from engagement with the notch engaging edge to release the jaws for snap force closure.

3. Apparatus according to claim 2 wherein the rocker arm contains a curved surface portion and the slip catch notch is defined in such curved surface portion.

4. Apparatus according to claim 2 wherein the intermediate portion of the frame is bowed and terminates in a pair of inwardly directed end jaws, and the frame perimetrically confines the spacer trigger in interposed relation therewithin.

5. Apparatus according to claim 4 wherein the frame is in the form of a substantially rectangularly perimetric flat leaf spring and the bowed intermediate portion is provided with a selectively peripherally outwardly extending crimped central spanning portion for increasing the biasing force of the frame.

6. Apparatus according to claim 4 wherein the spacer trigger is mounted on the frame for rocking about a pivot axis which divides the spacer trigger into the bait-carrier tripper portion located on the side of the pivot axis adjacent the jaws of the frame and a corresponding counter-balancing portion located on the side of the pivot axis remote from the jaws and adjacent the intermediate portion of the frame and sufficiently selectively heavier than the bait-carrier tripper portion for normally maintaining the slip catch notch in engagement with the notch engaging edge when the jaws are in cocked position.

7. Apparatus according to claim 1 wherein the frame includes means defining a pair of opposed arm receiving rocker openings therein at least one of which contains a slip catch notch engaging edge, and the spacer trigger is rockingly mounted on the frame and includes a pair of opposed rocker arms extending operatively through the arm receiving rocker openings at least one of which rocker arms correspondingly is arranged for unhindered relative movement with respect to the at least one rocker opening containing the notch engaging edge and is provided with a slip catch notch defined thereon for rockingly releasably engaging such notch engaging edge upon moving the jaws against the biasing force of the frame to the cocked position and thereby temporarily mantaining the jaws in spaced apart position until actuation of the bait-carrier tripper portion causes rocking of the rocker arms and in turn slipping of the corresponding notch from engagement with such notch engaging edge to release the jaws for snap force closure.

8. Apparatus according to claim 7 wherein the at least one rocker arm contains a curved surface portion and the slip catch notch is correspondingly defined in such curved surface portion.

9. Apparatus according to claim 7 wherein the other of the rocker arms contains an abutment shoulder inwardly of the frame and in facing relation to the corresponding arm receiving opening thereat and an offset outer end portion outwardly of the frame and in facing relation to such arm receiving opening to prevent relative linear movement between the spacer trigger and frame thereat while permitting relative rocking movement therebetween.

10. Apparatus according to claim 7 wherein the frame perimetrically confines the spacer trigger in interposed relation therewithin, and the rocker arms define a common pivot axis which divides the spacer trigger into the bait-carrier tripper portion located on the side of the pivot axis adjacent the jaws of the frame and a corresponding counter-balancing portion located on the side of the pivot axis remote from the jaws and adjacent the intermediate portion of the frame and sufficiently selectively heavier than the bait-carrier tripper portion for normally maintaining such slip catch notch in engagement with such notch engaging edge when the jaws are in cocked position.

* * * * *